United States Patent

[11] 3,611,979

| [72] | Inventor | Maurice E. Hebert<br>Sainte-Foye, Quebec, Canada |
|------|----------|---------------------------------|
| [21] | Appl. No. | 32,704 |
| [22] | Filed | Apr. 28, 1970 |
| [23] | | Division of Ser. No. 763,265, Sept. 27, 1968, Patent No. 3,534,701 |
| [45] | Patented | Oct. 12, 1971 |
| [73] | Assignee | Nanuk Inc.<br>Quebec, Canada |

[54] SUSPENSION FLOATATION CASING
7 Claims, 4 Drawing Figs.

[52] U.S. Cl. ................................................. 115/1
[51] Int. Cl. ..................................................... B63f 3/00
[50] Field of Search ........................................... 115/1

[56] References Cited
UNITED STATES PATENTS
3,154,045 10/1964 Fisher ........................... 115/1
3,474,751 10/1969 Hebert ......................... 115/1

Primary Examiner—Andrew H. Farrell
Attorney—Cushman, Darby & Cushman

ABSTRACT: A suspension for an amphibious vehicle having a buoyant body and a pair of drivable endless tracks. The suspension comprises a flotation casing disposed between the upper and lower travel of each of the tracks and secured to the vehicle frame for resilient displacement thereof to absorb shocks. A plurality of boggey wheels are secured to the underside of the casing to support the vehicle off the ground.

INVENTOR.
MAURICE E. HÉBERT
BY
Cushman, Darby + Cushman
ATTORNEYS

SUSPENSION FLOATATION CASING

This application is a division of my copending patent application Ser. No. 763,265 filed Sept. 27, 1968, now U.S. Pat. No. 3,534,701.

The present invention relates generally to vehicle suspensions and more particularly to a suspension flotation casing for a small amphibious snowmobile.

Suspensions normally used on a small snow vehicles include a plurality of strong flexible springs fixed to the underside of the vehicle and adapted to support a bogey wheel at each free end thereof to coact with an endless track for supporting the vehicle off the ground. When the vehicle is subjected to a shock between its underside and ground the suspension springs flex to substantially absorb this shock.

It is an object of the present invention to provide a flotation suspension casing for an amphibious snow vehicle which is secured on the underside to provide additional buoyancy and stock absorption.

According to one broad aspect the present invention relate to the improvement, in a vehicle having a buoyant body and a pair of drivable endless tracks; a vehicle frame, one or more suspension flotation casings disposed between the upper and lower travel of each said endless tracks, each said flotation casings being supported for resilient displacement substantially transverse to the longitudinal axis of said endless tracks to thereby effect shock absorption between the casing and the frame, said flotation casings each having a plurality of wheels extending from its lower surface, said wheels coacting with said track along its lower travel to support said vehicle off the ground.

The invention is illustrated, by way of example, in the accompanying drawings in which.

Figure 1:
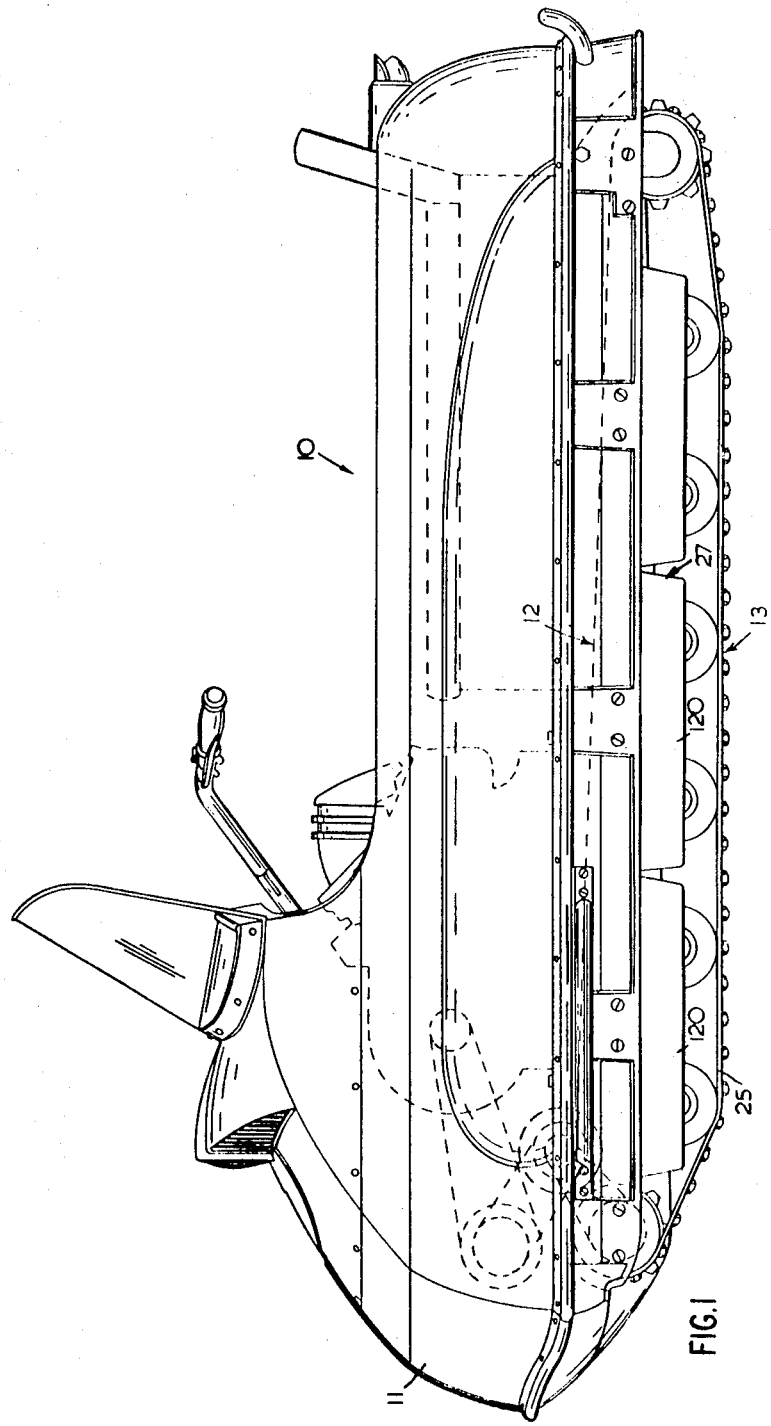
FIG. 1 is a side view of a snow vehicle showing the location of the flotation suspension casings.

Referring to the drawings and more specifically to FIG. 1 there is shown an amphibious snow vehicle, generally indicated at 10. The vehicle body 11 is supported off the ground by a suspension truck assembly 27 secured in cavities on the underside of the vehicle and coacting with an endless track 25. In the embodiment of FIG. 1 a suspension truck assembly 27 in secured on each side of the vehicle between the upper and lower travel, 12 and 13 respectively, of each said endless tracks. Although three flotation casing 120 are herein shown it is within the scope of the invention to provide one elongated casing on each side of the vehicle.

Figure 2:
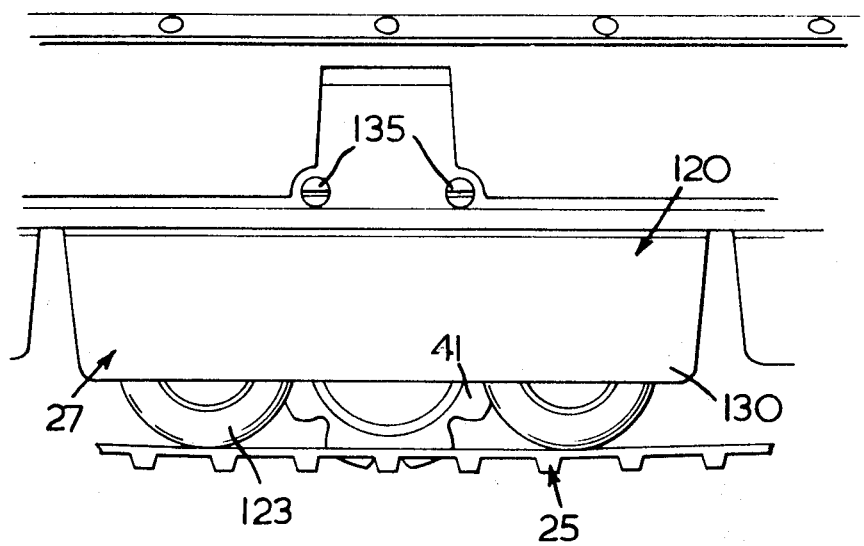
FIG. 2 is a side view of a flotation casing.
Figure 3:
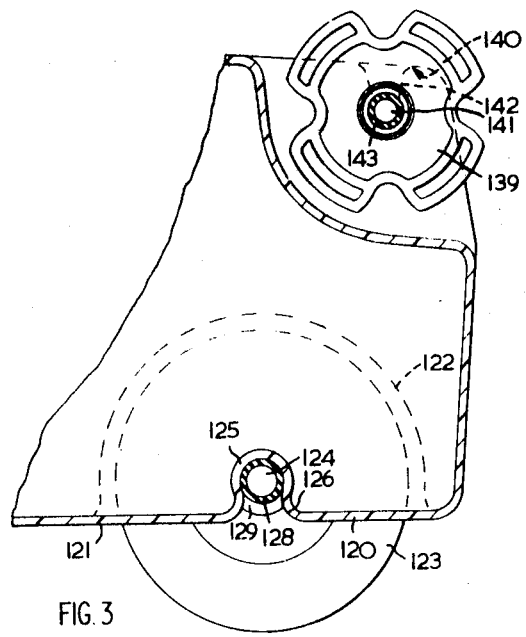
FIG. 3 is a side view, partly in section, of a fragmented portion flotation casing.
Figure 4:
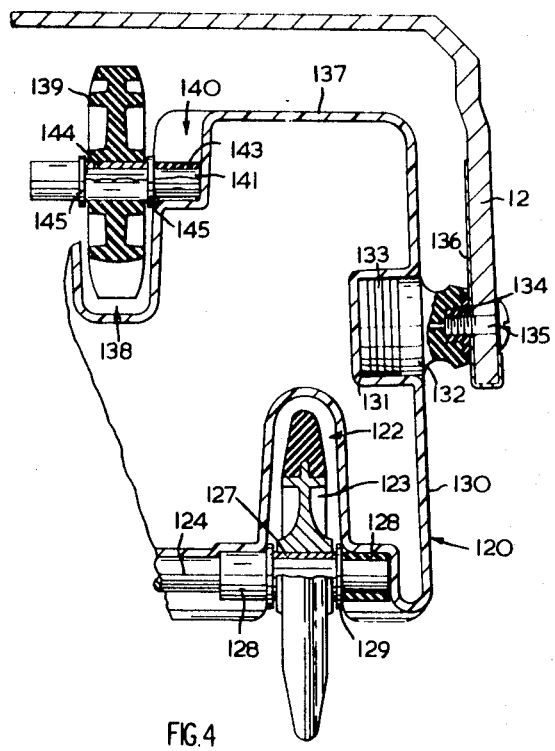
FIG. 4 is a front view, partly fragmented, of a portion of a flotation casing and suspension.

Referring to FIGS. 2, 3 and 4, there is shown the flotation casing 120 of the truck assembly 27. Each flotation casing 120 is hollow and of substantially rectangular configuration, with the exception of the front casing 120 (not shown) in each cavity which is preferably streamlined in its front portion to reduce the resistance with the flow of water under the vehicle when the vehicle is operated on a body of water. The flotation casings herein shown are molded from rigid thermoplastic material. On opposite side surfaces 130, of each casing 120, there is provided a pair of circular recesses or cavities 131 of selected diameter for securely receiving a respective supporting rubber mount 132. The free end portion of the supporting rubbermount 132, engaging in a recess or cavity 131, is provided with a plurality of circumferential ridges 133, each of the ridges 133 sloping downwardly away from the secured end of the mount 132 so that when the free end portion is inserted in the recess 131 a vacuum is created in the recess which prevents the free end from disengaging therewith. This rubber mount may also be retained within the cavity 131 by other securing means. The fixed end portion of each mount 132 is provided with a lug 134 embedded therein and adapted to receive a bolt 135 passing through the frame 12 for securing the mount 132 thereto.

With this arrangement it can be seen that further to the flotation provision of the casings 120, these will also absorb some of the shocks when the vehicle is travelling over rough terrain for the reason that the rubber mounts 132 will be flexed when the casing is subjected to a predetermined upward force when the endless track 25 passes over obstacles.

As can be seen from FIG. 4, the lower edge of the frame 12, of the vehicle, defining the outer side of each cavity, is reinforced throughout with an aluminum strip 136 shaped to the contour of the lower edge and secured thereto by the bolts 135 which also serve to retain the rubber mounts 132.

In the lower surface 121 of each flotation casing 120, there is provided four wheel receiving cavities 122, one substantially in each corner of the flotation casing 120, to receive a portion of a supporting wheel 123 therein and to permit free rotation thereof. Each pair of adjacent wheels 123 is secured on a respective axle 124 which is held in the lower surface 121 of the casing 120, transversely to the longitudinal axis of the cavities 13. The axle 124 is held in an elongated recess 125 which is disposed normal to the longitudinal axis of the casing 120 and in its lower surface 121, and aligned with the center of the diameter of adjacent wheel receiving cavities 122 at respective end of the casing 120. The elongated recess 125 is of substantially U-shape cross section, the sides of the U-configuration tapering slightly inwardly towards each other, and curvilinearly outwardly to the lower surface 121 of the casing 120, to define a boss 126 in the sides of the recess 125 to retain the axle 125 therein. The wheels 123 are mounted on a respective oiled bearing 127 and held in a fixed position, at their respective end of the axle 124, by means of a rubber bushing 128 and washer 129 located about the axle 124 on each side of the bearing 127 and abutting against the lower portion of the sides of the cavity 122. The portion of the elongated recess 125 receiving the rubber bushings 128, is slightly larger than the portion receiving the axle 124. To secure the wheels 123 in position, the axle assembly is merely snapped in position in the elongated recess 125.

Centrally located in the upper surface 137 of the flotation casing 121, is a wheel receiving cavity 138 for retaining a track guiding idler sprocket wheel 139. The cavity 138 is of substantially U-shaped cross section and defines a recess 140 in each side thereof and disposed adjacent each other to support an axle 141 horizontally and parallel to axles 124. The recesses 140 are substantially U-shape and define a boss 142 in the upper end of its respective side faces to retain the axle 141 fitted with a rubber bushing 143 about each end. The track guiding idler sprocket wheel 139 is mounted on an oilite bearing 144 held in position, in the cavity 138, by a washer 145 disposed about the axle 141 on each side of bearing 144 and abutting against the walls of the U-shape cavity 138. To position the track supporting idler sprocket wheel assembly, the ends of the axle 141, fitted with a respective bushing 143, are snapped in position in their respective recess 140. Although, herein described a track supporting idler wheel assembly is provided in the upper surface 137 of the flotation casing 121, this assembly may not be necessary and the tracks may be supported, in its upper travel, on the flat upper surface 137 of the casing 121.

As shown in FIG. 2 a guide sprocket wheel 41 may be provided in the lower surface of the flotation casing 120 and centrally positioned therein in a cavity and secured to the casing in a similar manner as that described hereinabove for wheels 123. The sprocket wheel 41 extends from the lower surface 121 of the casing 120 and engages with the center of the endless track 25 to prevent lateral displacement of the track 25 when the vehicle executes a turn or is driven over rough terrain. The idler sprocket wheel 41 may be provided in every casing or only in the middle casing of the complete endless track assembly, if such is desired.

While only a single embodiment of the invention has been shown and described, it is not intended to be limited thereto but only by the scope of the appended claims.

I claim:

1. In a vehicle having a buoyant body and a pair of drivable endless tracks: a vehicle frame, one or more suspension flotation casings disposed between the upper and the lower travel of each said endless tracks, each said flotation casings being supported by the frame for resilient displacement substantially transverse to the longitudinal axis of said endless tracks to thereby effect shock absorption between the casing and the frame, said flotation casings each having a plurality of wheels extending from its lower surface, said wheels coacting with said track along its lower travel to support said vehicle off the ground.

2. A vehicle as claimed in claim 1 wherein each said flotation casing is of substantially rectangular configuration, at least one recess in each sidewall thereof adapted to receive and retain a free end portion of a respective flexible rubber mount secured to said vehicle frame.

3. A vehicle as claimed in claim 2 wherein said recess and free end portion of said rubber mount are circular, said free end portion defining a plurality of circumferential ridges sloping downwardly away from its free end and secured within said circular recess.

4. A vehicle as claimed in claim 1 wherein each said flotation casing is of substantially rectangular configuration and wherein a track guiding idler wheel is supported and extends from the upper surface of said casing to guide said endless track during its upper travel.

5. A vehicle as claimed in claim 4 wherein an elongated recess is provided in the lower surface of said flotation casing and extends transversely to the longitudinal axis and adjacent each end of said casing, and two semicircular cavities in said lower surface, said cavities being of uniform width and centrally and transversely located with respect to said elongated recess, said elongated recess being adapted to detachably retain an axle having a wheel supported adjacent each end thereof, each said wheel being partly disposed in a respective one of said semicircular cavities.

6. A vehicle as claimed in claim 4 wherein said track guiding idler wheel is a sprocket wheel mounted on an axle, said axle and guiding idler wheel being positioned in a semicircular cavity being disposed parallel to the longitudinal axis of said flotation casing, and a recess in each sidewall of said semicircular cavity adapted to retain said axle therein transverse to the longitudinal axis of said cavity so that said wheel is freely rotatable in said cavity and partly extends above said upper surface of said casing.

7. A vehicle as claimed in claim 1 wherein each said flotation casing is a hollow casing moulded from a rigid thermoplastic material.